United States Patent [19]
Bates et al.

[11] 3,908,963
[45] Sept. 30, 1975

[54] TENSIONER CONSTRUCTION

[75] Inventors: H. John Bates, Danville; Albert Louie, San Leandro; John F. Gee, Oakland, all of Calif.

[73] Assignee: The Rucker Company, Oakland, Calif.

[22] Filed: Sept. 30, 1974

[21] Appl. No.: 510,364

[52] U.S. Cl. .................... 254/172; 59/95; 74/246; 254/189
[51] Int. Cl.² .......................................... B66D 3/08
[58] Field of Search.... 254/172, 189, 173 R, 135 R; 59/95, 84, 85, 86, 78, 73; 74/246, 247, 258; 198/189; 175/5, 27

[56] References Cited
UNITED STATES PATENTS

| | | | |
|---|---|---|---|
| 2,066,852 | 1/1937 | Plummer | 74/246 |
| 2,434,318 | 1/1948 | Haubert | 59/95 |
| 2,812,971 | 11/1957 | Teutsch | 59/95 |
| 3,314,657 | 4/1967 | Prud'homme et al. | 254/189 |
| 3,804,183 | 4/1974 | Duncan et al. | 254/172 |
| 3,823,918 | 7/1974 | Barnett | 254/189 |

*Primary Examiner*—David Schonberg
*Assistant Examiner*—David M. Mitchell
*Attorney, Agent, or Firm*—Lothrop & West

[57] ABSTRACT

A tensioner construction has a cylinder with a plunger reciprocable therein. At least one pulley is mounted on the plunger to turn about an axis and another pulley is mounted on the cylinder to turn about a parallel axis. Fastened to the cylinder is a flexible force and motion transmitter including at least a pair of chain lengths each made up of a plurality of links fastened side-by-side and fastened end-to-end to additional, similar links by pins parallel to the pulley axis. One chain length has a body with fingers at one end pivotally secured by a parallel pin to adjacent ones of the links and has a ball at the other end. Another chain length has a similar body with fingers at one end pivotally secured by a normally parallel pin to other, adjacent links and at the other end has a socket encompassing and rotatable on the ball. The chain links and the bodies with the ball and the socket are reeved over the pulleys and are extended from the pulleys for bending in a direction normal to the mentioned axis and also in directions having a component parallel to that axis. The ball and socket bodies are thicker than the chain lengths and are tapered for smooth contact with the pulleys.

6 Claims, 5 Drawing Figures

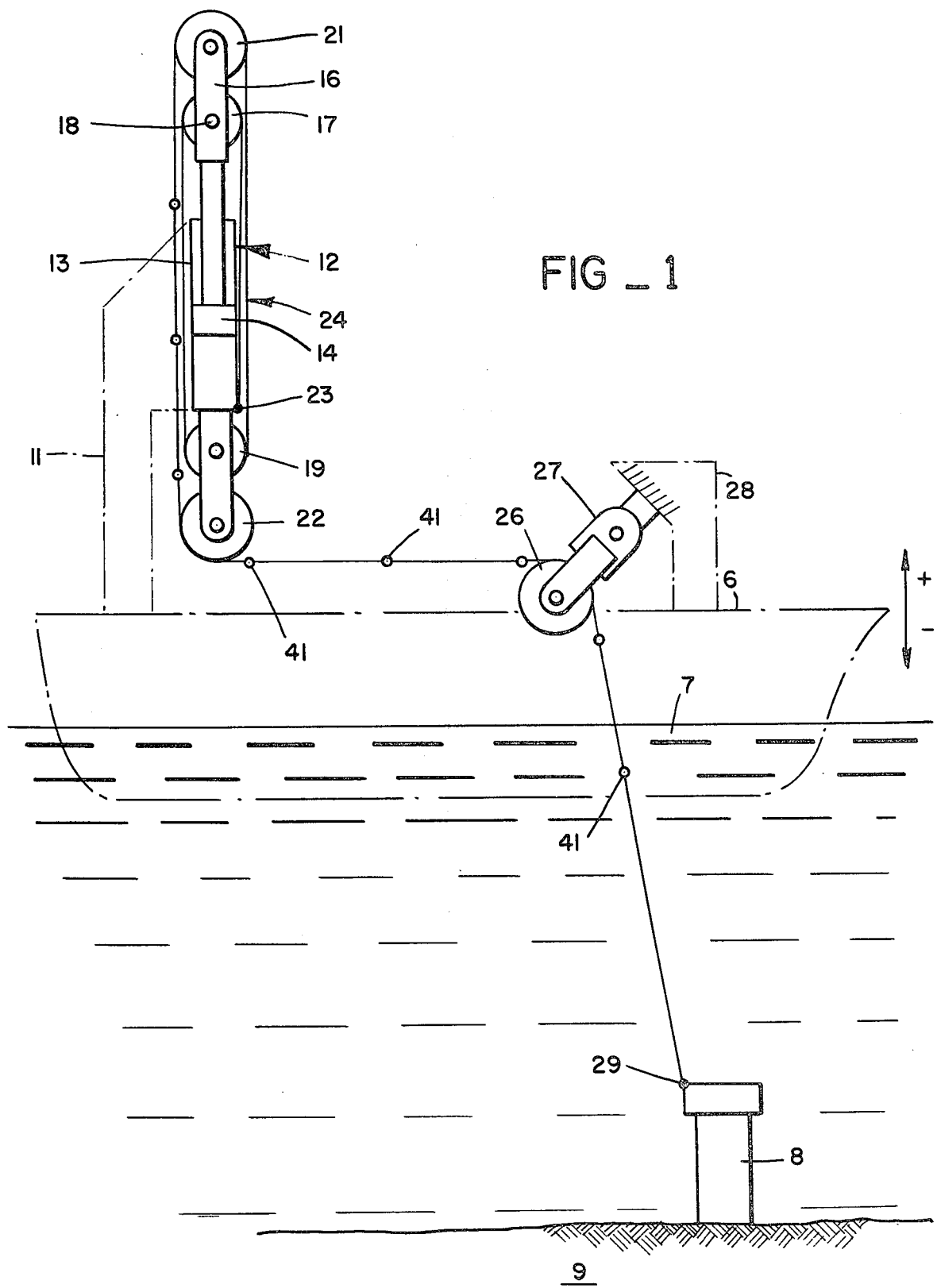
FIG_1

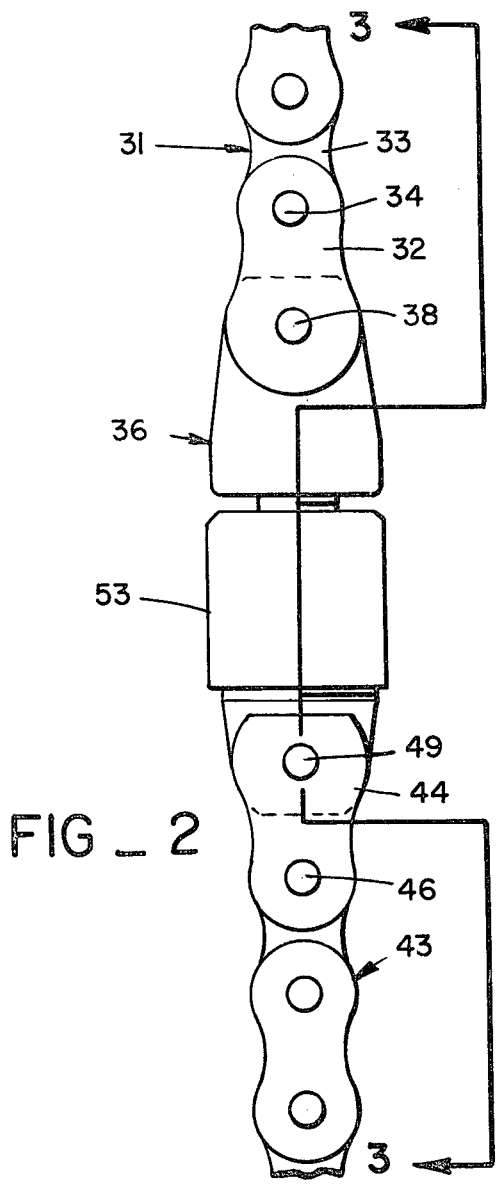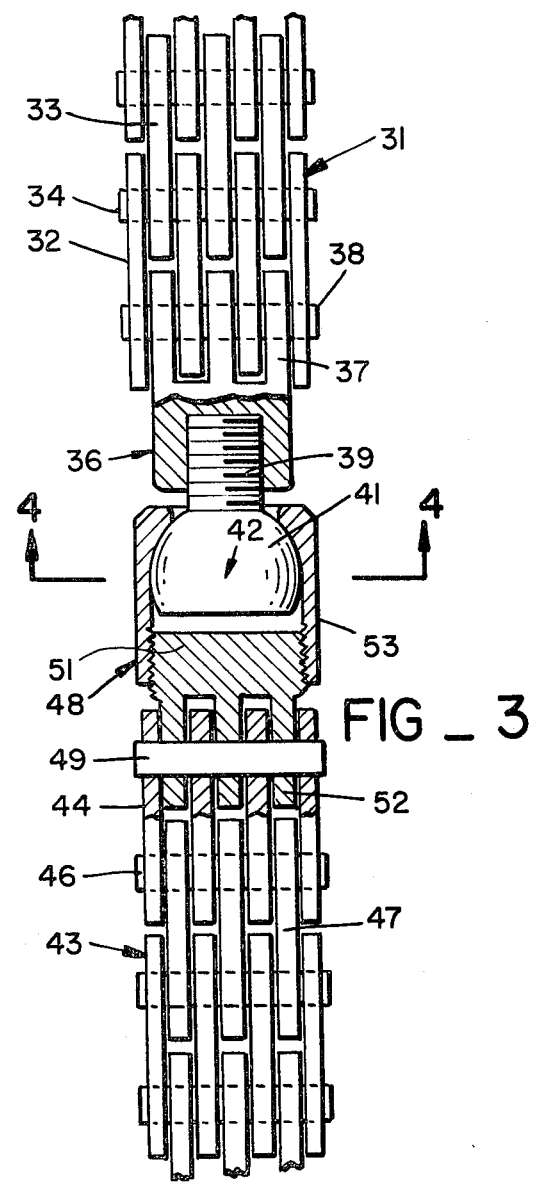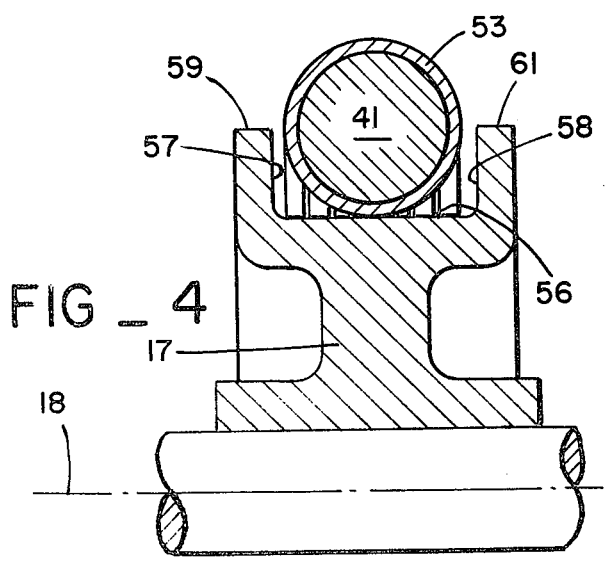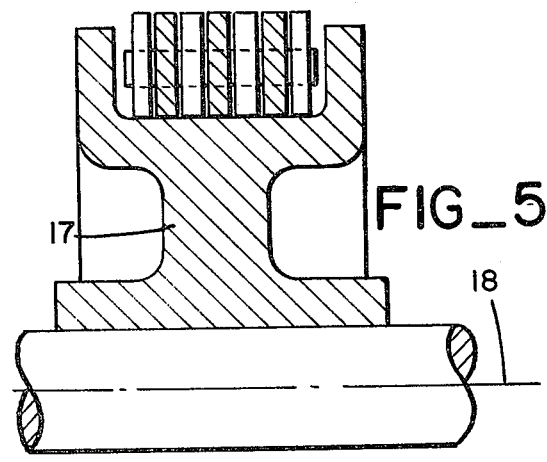

TENSIONER CONSTRUCTION

The tensioner construction is useful in a number of different fields, particularly in connection with oil drilling rigs and the like, as shown in the Duncan et al. U.S. Pat. No. 3,804,183 of Apr. 16, 1974 and particularly with tensioners of the sort shown in the Prud'homme et al. U.S. Pat. No. 3,314,657 of Apr. 18, 1967.

In offshore oil drilling it is customary to provide a vessel or barge carrying much of the drilling rig and carrying out drilling in a well situated generally beneath the vessel. Because of the motion of the water, the vessel is firmly anchored or held as nearly as possible in its correct location over the well, but even so there is some variation in vessel position with respect to the well, not only in a vertical sense but also in various horizontal directions. This relative motion is taken up vertically by an automatically functioning tensioner of the sort identified above. The lateral motion is also taken up by the tensioner because it is particularly accommodated or converted to vertical motion by flexibility in the cable connections between the drilling vessel and the well. Drilling equipment has gotten larger and larger as the exploration and drilling for oil has gotten into more and more difficult situations. The corresponding increase in size of flexible cable is approaching or has gotten to a point wherein the cable is so large in diameter as to be far less flexible than before. It also has gotten heavy enough and bulky enough and awkward enough to work with so that the drilling crews have great difficulty in handling the cable; that is, in repositioning it or renewing it, or threading it, or reeving it.

It is therefore an object of the present invention to provide a means for interconnecting a tensioner mechanism with anchor or well equipment in such a fashion as to afford or maintain adequate flexiblity in various horizontal or lateral directions and at the same time to permit the normal or usual operation of the tensioner equipment.

Another object of the invention is to provide an arrangement that is strong enough and large enough to take the present day loads yet is easily enough handled by the drilling crew as to maintain or reduce their normal efforts.

Another object of the invention is in general to provide an improved tensioner construction.

A further object of the invention is to provide an improved tensioner construction in which much of the present technique can be preserved and adapted to take care of newly encountered conditions.

Other objects, together with the foregoing, are attained in the embodiment of the invention described in the accompanying description and illustrated in the accompanying drawings, in which:

FIG. 1 is a diagram showing in side elevation a tensioner construction in its customary drilling environment;

FIG. 2 is a fragmentary view showing in side elevation a particular tensioner construction pursuant to the invention;

FIG. 3 is a cross-section on several planes indicated by the lines 3—3 in FIG. 2;

FIG. 4 is a cross-section through a pulley included in the tensioner construction, the plane of section being indicated by the lines 4—4 of FIG. 3; and FIG. 5 is a view comparable to FIG. 4 but being in cross-section, the plane of which is indicated by the line 5—5 of FIG. 3.

Although by no means confined to its application in a drilling situation, nevertheless the present arrangement is particularly adapted for such use. As an example, there is ordinarily provided a barge or vessel 6 floating on a body of water 7 in the vicinity of and at least largely over a well 8 or anchor in the bottom 9 of the water body.

On the barge or vessel 6 in a convenient location and diagrammatically illustrated as being secured thereon by a frame 11, is a tensioner 12 of the sort shown in the above-identified Prud'homme et al. patent. The tensioner includes a cylinder 13 which is stationary with respect to the vessel 6 and also includes a plunger 14 that is reciprocable in the cylinder and is hydraulically controlled in the ordinary case. The plunger 14 at its external end is provided with a yoke 16 carrying a pulley 17 of the customary diameter and mounted for rotation in the yoke and with respect to the tensioner about a horizontal axis 18. In the present instance the cylinder 13 or the frame 11 also serves as a mounting for a second pulley 19 having its axis parallel to the axis 18. In addition, there is a third, larger diameter pulley 21 mounted in the yoke 16 with its axis parallel to the axis 18 also. In a similar fashion the cylinder or frame supports a larger diameter fourth pulley 22 with its axis parallel to the axis 18.

Secured to the frame or particularly to the cylinder 13 of the tensioner at an anchor 23 is a flexible force and motion transmitter, generally designated 24. This is extended from the anchor or fixed point 23 around the first pulley 17 then around the second pulley 19 following which it is reeved around the somewhat larger diameter third pulley 21 and finally around the similarly enlarged fourth pulley 22. The transmitter 24 extends then around an independent pulley 26 that has a double pivot connection 27 to a fixed mounting 28 on the barge or vessel 6. The force and motion transmitter 24 then extends to a connection 29 on the stationary well mechanism 8 or other fixed point. As the vessel 6 rises and falls with respect to the well mechanism 8, the tensioner 12 maintains a predetermined tensioner in the transmitter 24 and as the vessel moves forward and aft and also side to side, the tensioner maintains a fixed tension while the force and motion transmitter 24 flexes in a fore and aft direction and also in transverse directions.

To permit the desired flexing of the transmitter and for other purposes, a special construction is adopted. As shown particularly in FIGS. 2 and 3, there is preferably provided a first chain length, generally designated 31, made up of a number of links 32 arranged side-by-side and interspersed with similar links 33 arranged end-to-end relative to the first links 32. The links are pivoted with respect to each other by cross pins 34 disposed with their axes parallel to the axis 18 of the first pulley 17. The various parallel links 32 are connected at one end to a first body 36 having fingers 37 interspersed with the links 32 and secured pivotally thereto by a first pin 38 having its axis parallel to the axis 18. The body 36 is internally threaded to receive the threaded shank 39 of a ball 41 or partially spherical member arranged with its center 42 on the side of the first body away from the fingers 37.

In a somewhat comparable fashion there is a second chain length 43 incorporating a number of side-by-side links 44 connected by a pivot pin 46 extending parallel (at rest) to the pin 34 and interconnecting such links to additional links 47 disposed end-to-end relative to the links 44. The links 44 are joined to a second body 48 by a second pivot pin 49, the axis of which can be parallel to the axis 18. The second body 48 is composite and includes a threaded male member 51 extending from fingers 52 interspersed with the links 44. The male member 51 engages the threaded interior of a spherical socket 53 surrounding and rotatable about the center 42 with respect to the ball 41 and acting in a measure to confine the ball to a limited extent. The bodies 36 and 48 can move with respect to each other universally except that they cannot so move in the direction of the length of the force and motion transmitter 24. Thus, while preserving the chain length and transmitting adequate tension or longitudinal force, the several chain lengths, such as the first chain length 31 and the second chain length 43, can twist and turn and offset or slant laterally in all directions (within substantial angles) with regard to each other.

In an arrangement of this sort there can be provided an almost unlimited number of individual chain lengths made up of transversely pivoted links and there can be included therewith a number of ball and socket connections spaced apart, as desired, for the particular installation. For convenience herein, but one pair of chain lengths and a single ball and socket joint are described in detail but as diagrammatically shown in FIG. 1, a large number of the ball and socket joints 41 and 53 are incorporated in the usual case.

The preferred installation is to have the force and motion transmitter 24 trained around the individual sheaves 17, 19, 21 and 22 as well as the sheave or pulley 26 and for that reason the sheaves are particularly constructed. As shown especially in FIGS. 4 and 5, the sheave 17, as an example of the others, is provided with a central, circular-cylindrical surface 56 generated around the axis 18 and disposed between a pair of normal surfaces 57 and 58 at either end of the surface 56 and formed on lateral flanges 59 and 61. The arrangement is such that the various links, such as 32 and 33 as well as 44 and 47, lie against the surface 56 approximately tangent thereto and between the surfaces 57 and 58. In a similar fashion the bodies 36 and 48 lie approximately tangent to and against the surface 56 between the flanges 59 and 61.

Since the outside dimension or diameter of the socket 53 is considerably greater in radial extent that are the links such as 44 and since otherwise there might be a rough transition between the chain lengths and the bodies 36 and 48 on the pulley 17 and other pulleys, it is preferably arranged that the fingers 37 and the fingers 52 are tapered in a tangential direction as are the adjacent ends of the connecting links 32 and 44 and also as are the adjacent portions of the socket 53 and the body 36 and the member 51, particularly as shown in side elevation in FIG. 2. There is in effect a diverging and then a converging taper to make the transition smoothly from the radially relatively thin links to the radially relatively thick ball joint. In this way it has been found that the various chain lengths and intervening ball joints pass with reasonable smoothness around and over the pulleys and other guides.

With this arrangement considerable tension can be transmitted between the tensioner and the anchor or well mechanism. The individual parts can easily be handled by crew members in a known way. The chain lengths and pins do not admit of any lateral flexure but only of radial flexure, but the intervening ball joints are spaced closely enough to each other and have sufficient freedom not only in a radial direction or plane but likewise in transverse directions or in directions having transverse components so that there is adequate lateral or transverse flexibility in the force transmitter 24. The vessel 6 can easily be appropriately confined near the well mechanism 8, although allowed some lateral or transverse excursion. There has consequently been provided a tensioner construction which admits of the desired tension being transmitted yet provides for lateral motion or flexibility and is of a nature that the work crews can easily handle.

What is claimed is:

1. In a tensioner construction a pulley mounted on said tensioner for rotation about an axis and having a circular-cylindrical surface concentric with said axis, a first chain length adapted to contact said surface and including a plurality of individual first links arranged side-by-side and interspersed with other first links arranged end-to-end, first pins parallel to said axis connecting said first links, a first body having first fingers interspersed between the ends of some of said first links, a first body pin parallel to said axis and connecting said first fingers and said ends of said first links, a spherical head, means connecting said head and said first body with the center of said head on the side of said first pin opposite said first links, a second chain length adapted to contact said surface and including a plurality of individual second links arranged side-by-side and interspersed with other second links arranged end-to-end, second pins parallel to said axis connecting said second links, a second body having fingers interspersed between the ends of some of said second links, a second body pin parallel to said second pins and connecting said second fingers and said ends of some of said second links, a spherical socket encompassing and rotatable on said head, and means connecting said socket and said second body with the center of said socket on the side of said second pin opposite said second links.

2. A device as in claim 1 in which said pulley has a pair of side flanges normal to said axis and at opposite ends of said surface, and said first chain length and said second chain length are substantially as wide as the width of said surface between said flanges.

3. A device as in claim 1 in which said first links and said second links have a predetermined radial thickness and said socket has a greater radial thickness.

4. A device as in claim 3 in which said first body and said second body have a radial thickness enlarging from substantially that of said links near said fingers to that of said socket near said socket.

5. A device as in claim 1 in which said tensioner includes a frame having a cylinder fixed thereon and includes a plunger reciprocable in said cylinder and in which said pulley is rotatably mounted on said plunger, said device including means for securing one end of said first chain length to said frame.

6. A device as in claim 5 including a second pulley coplanar with said first pulley and mounted for rotation on said plunger about a second axis displaced from said first axis in a direction away from said cylinder, a third pulley mounted on said frame for rotation about a third axis parallel to said first axis, a fourth pulley coplanar with said third pulley and mounted on said frame for rotation about a fourth axis parallel to said third axis, and said first chain length and said second chain length being duplicated a plurality of times to engage said first pulley, said third pulley, said second pulley and said fourth pulley in succession.

* * * * *